United States Patent
Oh et al.

(10) Patent No.: US 12,467,589 B2
(45) Date of Patent: Nov. 11, 2025

(54) COMBINED POWER GENERATION FACILITY

(71) Applicant: Seoung Jae Oh, Jeollanam-do (KR)

(72) Inventors: Seoung Jae Oh, Jeollanam-do (KR); Jeong Seok Ha, Gwangju (KR)

(73) Assignee: Seoung Jae OH, Jeollanam-do (KR)

( * ) Notice: Subject to any disclaimer, the term of this patent is extended or adjusted under 35 U.S.C. 154(b) by 438 days.

(21) Appl. No.: 18/009,745

(22) PCT Filed: Nov. 27, 2020

(86) PCT No.: PCT/KR2020/017188
§ 371 (c)(1),
(2) Date: Dec. 12, 2022

(87) PCT Pub. No.: WO2021/251568
PCT Pub. Date: Dec. 16, 2021

(65) Prior Publication Data
US 2023/0243472 A1    Aug. 3, 2023

(30) Foreign Application Priority Data
Jun. 10, 2020 (KR) .......... 10-2020-0070408

(51) Int. Cl.
*F17C 9/04* (2006.01)
*F17C 13/00* (2006.01)

(52) U.S. Cl.
CPC .............. *F17C 9/04* (2013.01); *F17C 13/004* (2013.01); *F17C 2221/033* (2013.01); *F17C 2270/0581* (2013.01)

(58) Field of Classification Search
CPC .... F17C 9/04; F17C 13/004; F17C 2221/033; F17C 2270/0581
See application file for complete search history.

(56) References Cited

U.S. PATENT DOCUMENTS 3,677,019 A * 7/1972 Olszewski ............. F25J 1/0254
62/613

FOREIGN PATENT DOCUMENTS

JP      2017116090 A *  6/2017 ................ F17C 9/02
KR   10-2013-0117375 A    10/2013
(Continued)

OTHER PUBLICATIONS

English Translation KR20140012282A (Year: 2014).*
(Continued)

*Primary Examiner* — Shafiq Mian
(74) *Attorney, Agent, or Firm* — Revolution IP, PLLC

(57) ABSTRACT

The present invention provides a complex power generation facility including a first transfer unit that transfers liquefied natural gas; a first heat exchange apparatus that causes the liquefied natural gas supplied from the first transfer unit to exchange heat with seawater, vaporizes the liquefied natural gas into natural gas, heats the seawater into hot water, and discharges the hot water; a second heat exchange apparatus that selectively receives the hot water discharged from the first heat exchange apparatus and caused the natural gas passing through the first heat exchange apparatus to exchange heat with seawater and hot water; and a power generation unit that generates power as the natural gas supplied from the second heat exchange apparatus passes therethrough.

13 Claims, 7 Drawing Sheets

(56) References Cited

FOREIGN PATENT DOCUMENTS

| KR | 20130117375 A | * | 10/2013 | ................ F17C 7/04 |
| KR | 10-2014-0012282 A | | 2/2014 | |
| KR | 20140012282 A | * | 2/2014 | ................ F17C 9/02 |
| KR | 10-2017-0133135 A | | 12/2017 | |
| KR | 20170133135 A | * | 12/2017 | ................ F17C 9/02 |
| KR | 10-2019-0122050 A | | 10/2019 | |

OTHER PUBLICATIONS

English Translation JP-2017116090-A (Year: 2017).*
English Translation KR-20130117375-A (Year: 2013).*
English Translation KR-20170133135-A (Year: 2017).*
International Search Report for PCT/KR2020/017188 mailed Mar. 5, 2021 from Korean Intellectual Property Office.

* cited by examiner

210

COMBINED POWER GENERATION FACILITY

TECHNICAL FIELD

The present invention relates to a complex power generation facility, and more particularly, to a complex power generation facility that vaporizes liquefied natural gas into natural gas by using seawater and generates power by using high-pressure natural gas.

BACKGROUND

In general, natural gas (NG) is liquefied as liquefied natural gas (LNG) in a cryogenic state at a production site for the sake of convenient transportation to be transported to a remote location by a liquefied natural gas carrier. The liquefied natural gas is obtained by cooling natural gas from an atmospheric pressure to a cryogenic temperature of about −163° C., and a volume thereof is reduced to about 1/600 compared to a volume of natural gas in a gaseous state. Accordingly, the liquefied natural gas is very suitable for long-distance transport through the sea.

Liquefied natural gas has to be vaporized again as natural gas after reaching a destination to be supplied to each supplier. At this time, in order to vaporize the liquefied natural gas into the natural gas, the liquefied natural gas may exchange heat with seawater. In this case, liquefied natural gas at −163° C. is vaporized into natural gas at 0° C., and seawater is cooled from about 15° C. to about 12° C.

Meanwhile, a required pressure of natural gas supplied to a destination may change depending on places or environments (for example, a home, a thermal power plant, and so on) that receives natural gas. In this case, the natural gas transported from a production site to the destination needs to be depressurized according to the required pressure, and when power is generated by using a change in pressure of the natural gas, a more efficient apparatus may be designed.

SUMMARY OF INVENTION

Technical Problem

An object of the present invention is to provide a complex power generation facility with high efficiency in the process of vaporizing liquefied natural gas into natural gas by using seawater and in the process of generating power by using high-pressure natural gas.

Solution to Problem

The present invention provides a complex power generation facility including a first transfer unit that transfers liquefied natural gas; a first heat exchange apparatus that causes the liquefied natural gas supplied from the first transfer unit to exchange heat with seawater, vaporizes the liquefied natural gas into natural gas, heats the seawater into hot water, and discharges the hot water; a second heat exchange apparatus that selectively receives the hot water discharged from the first heat exchange apparatus and causes the natural gas passing through the first heat exchange apparatus to exchange heat with seawater and hot water; and a power generation unit that generates power as the natural gas supplied from the second heat exchange apparatus passes therethrough.

The complex power generation facility according to the present invention may further include a second transfer unit that transfers the natural gas discharged from the first heat exchange apparatus to the second heat exchange apparatus, and a third transfer unit that transfers the natural gas discharged from the second heat exchange apparatus to the power generation unit.

The first transfer unit may include a first transfer line, a first pressurization line connected to the first transfer line in parallel and provided with first pressurization means for pressurizing liquefied natural gas, and a first switching valve that is installed at inlets of the first transfer line and the first pressurization line and selectively supplies received liquefied natural gas to any one of the first transfer line and the first pressurization line.

The second transfer unit may include a second transfer line, a second pressurization line connected to the second transfer line in parallel and provided with second pressurization means for pressurizing natural gas, and a second switching valve that is installed at inlets of the second transfer line and the second pressurization line and selectively supplies received liquefied natural gas to any one of the second transfer line and the second pressurization line, and the third transfer unit may include a third transfer line, a third pressurization line connected to the third transfer line in parallel and provided with third pressurization means for pressurizing natural gas, and a third switching valve that is installed at inlets of the third transfer line and the third pressurization line and selectively supplies received liquefied natural gas to any one of the third transfer line and the third pressurization line.

In the first mode, liquefied natural gas supplied to the first switching valve may be supplied to the first pressurization line to be pressurized by the first pressurization means, and then supplied to the first heat exchange apparatus, natural gas discharged from the first heat exchange apparatus and supplied to the second switching valve may be supplied to the second heat exchange apparatus through the second transfer line, and natural gas discharged from the second heat exchange apparatus and supplied to the third switching valve may be supplied to the power generation unit through the third transfer line.

In the second mode, liquefied natural gas supplied to the first switching valve may be supplied to the first heat exchange apparatus through the first transfer line, natural gas discharged from the first heat exchange apparatus and supplied to the second switching valve may be supplied to the second pressurization line to be pressurized by the second pressurization means and then supplied to the second heat exchange apparatus, and natural gas discharged from the second heat exchange apparatus and supplied to the third switching valve may be supplied to the third pressurization line to be pressurized by the third pressurization means and then supplied to the power generation unit.

The complex power generation facility may further include a cold-heat storage device that is installed between the first transfer unit and the first heat exchange apparatus and selectively heats or cools the liquefied natural gas by using a phase change of a refrigerant, wherein, in the third mode, liquefied natural gas supplied to the first switching valve may be supplied to the first pressurization line to be pressurized by the first pressurization means and then passes through the cold-heat storage device to be supplied to the first heat exchange apparatus, natural gas discharged from the first heat exchange apparatus and supplied to the second switching valve may be supplied to the second pressurization line to be pressurized by the second pressurization means and then supplied to the second heat exchange apparatus, and natural gas discharged from the second heat exchange apparatus and supplied to the third switching valve may be supplied to the third pressurization line to be pressurized by the third pressurization means and then supplied to the power generation unit.

The power generation unit may include a first turbine, and a second turbine that is connected to the first turbine in parallel and depressurizes the received natural gas to have a pressure less than a pressure of the first turbine.

The complex power generation facility may further include a first line in which seawater flows, a second line that connects the first line to the first heat exchange apparatus and supplies part of the seawater flowing into the first line to the first heat exchange apparatus, a third line that connects the first line to the first heat exchange apparatus and receives hot water discharged from the first heat exchange apparatus, and a fourth line that connects the first line to the third line and supplies the second heat exchange apparatus with seawater supplied from the first line and hot water supplied from the third line.

The complex power generation facility may further include a fifth line in which the hot water discharged from the first heat exchange apparatus flows, a sixth line that connects the fifth line to the first heat exchange apparatus and supplies hot water discharged from the first heat exchange apparatus to the fifth line, a seventh line that connects the fifth line to the first heat exchange apparatus and supplies hot water discharged from the second heat exchange apparatus to the first heat exchange apparatus, and an eighth line that is connected to the fifth line to the seventh line and supplies the hot water discharged from the second heat exchange apparatus to the fifth line and the seventh line.

The complex power generation facility may further include a first valve that is installed at a connection portion between the first line, the third line, and the fourth line, and selectively supplies seawater or hot water supplied from any one of the first line and the third line to the fourth line, and a second valve that is installed at a connection portion between the fifth line, the seventh line, and the eighth line, and selectively supplies hot water supplied from the eighth line to any one of the fifth line and the seventh line.

The complex power generation facility may further include auxiliary power generation means that is installed in the fifth line and generates power as hot water flowing through the fifth line passes therethrough.

The first heat exchange apparatus may include a heat exchanger that vaporizes liquefied natural gas passing therethrough and includes a heat exchange case into which seawater flows and a gas flow line through which the liquefied natural gas passes and which penetrates the heat exchange case, a reservoir that accommodates seawater, a heat source that is installed in the reservoir and heats seawater flowing into the reservoir, and a seawater flow line which connects the heat exchanger to the reservoir and through which seawater flows.

The first heat exchange apparatus may include a reservoir that accommodates seawater, a heat source that is installed in the reservoir and heats seawater flowing into the reservoir, a seawater flow line which is connected to the reservoir and through which seawater flows, and a gas flow line which is partially accommodated in the reservoir and through which liquefied natural gas passes.

The heat source may be a data center.

Advantageous Effects of Invention

A complex power generation facility according to the present invention may vaporize liquefied natural gas into natural gas by using heat of seawater, generate power by enabling high-pressure natural gas to pass through a power generation unit, and sufficiently supply the amount of heat required for vaporization of the liquefied natural gas by additionally heating seawater by using a data center.

In particular, according to the complex power generation facility 1000 of the present invention, seawater supplied to the first heat exchange apparatus 1400 may be selectively supplied to the second heat exchange apparatus 1500 to supplement the amount of heat of natural gas required by the second heat exchange apparatus 1500, and seawater discharged from the second heat exchange apparatus 1500 is heated by selectively passing through the first heat exchange apparatus 1400 to sufficiently heat the seawater to be discharged to the sea, and thus, a marine ecosystem may be prevented from being damaged due to cold drainage.

BEST MODE FOR INVENTION

Figure 1:
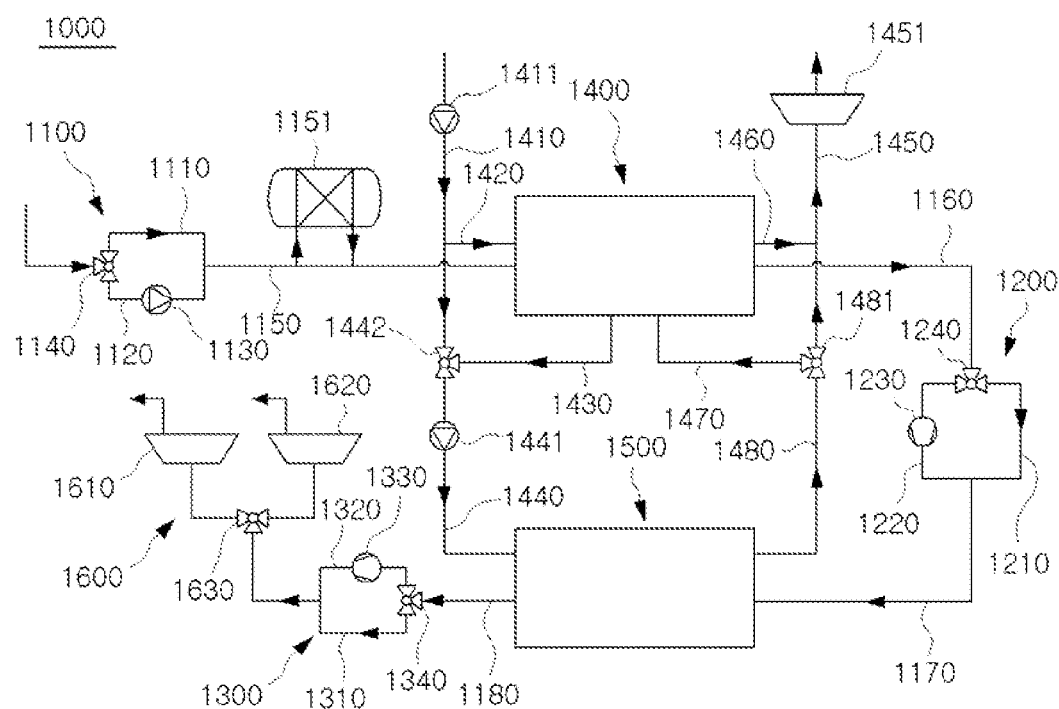
FIG. 1 is a distribution diagram of a complex power generation facility according to the present invention.

Although the present invention is described with reference to embodiments illustrated in the drawings, the embodiments are merely examples, and it will be understood by those skilled in the art that various modifications and equivalent other embodiments may be derived therefrom. Accordingly, the true technical protection scope of the present invention should be determined by the technical idea of the appended claims.

Referring to FIG. 1, a complex power generation facility 1000 according to the present invention includes a first transfer unit 1100, a second transfer unit 1200, a third transfer unit 1300, a first heat exchange apparatus 1400, a second heat exchange apparatus 1500, and a power generation unit 1600.

The first transfer unit 1100 transfers liquefied natural gas (LNG) to the first heat exchange apparatus 1400. The first heat exchange apparatus 1400 heat-changes the liquefied natural gas supplied from the first transfer unit 1100 with seawater to vaporize the liquefied natural gas into natural gas (NG) and heats the seawater into hot water to discharge the hot water. The second heat exchange apparatus 1500 is selectively supplied with the hot water discharged from the first heat exchange apparatus 1400 and heat-changes the natural gas passing through the first heat exchange apparatus 1400 with seawater flowing from the sea and the hot water supplied from the first heat exchange apparatus 1400. The power generation unit 1600 generates power as the natural gas supplied from the second heat exchange apparatus 1500 passes therethrough.

The second transfer unit 1200 is installed between the first heat exchange apparatus 1400 and the second heat exchange apparatus 1500, and transfers the natural gas discharged from the first heat exchange apparatus 1400 to the second heat exchange apparatus. The third transfer unit 1300 is installed between the second heat exchange apparatus 1500 and the power generation unit 1600 and transfers the natural gas discharged from the second heat exchange apparatus 1500 to the power generation unit 1600.

The first heat exchange apparatus 1400 and the second heat exchange apparatus 1500 may heat the received seawater by using an electrical heat source (for example, a data center), and then heat-change the heated seawater with liquefied natural gas or natural gas. In this case, the complex power generation facility 1000 according to the present invention may have advantage of vaporizing liquefied natural gas or increasing a temperature of natural gas by using waste heat generated by a server of a data center, or so on, and not generating a separate emission while increasing heat conversion efficiency more than the known gas heater system.

In particular, the complex power generation facility 1000 according to the present invention may selectively supply the second heat exchange apparatus 1500 with the seawater supplied to the first heat exchange apparatus 1400, thereby supplementing amount of heating of natural gas, and selectively enables seawater discharged from the second heat exchange apparatus 1500 to pass through the first heat exchange apparatus 1400 to heat the seawater and then discharge the seawater to the sea, and thus, a marine ecosystem may be prevented from being damaged due to cold drainage because the seawater is discharged to the sea after being sufficiently heated.

The first transfer unit 1100 includes a first transfer line 1110, a first pressurization line 1120, first pressurization means 1130, and a first switching valve 1140. The first transfer line 1110 and the first pressure line 1120 are connected to each other in parallel. The first pressurization means 1130 is installed in the first pressurization line 1120. The first switching valve 1140 is installed at inlets of the first transfer line 1110 and the first pressurization line 1120. When liquefied natural gas flows into the first switching valve 1140, the first switching valve 1140 selectively transfers the liquefied natural gas to one of the first transfer line 1110 and the first pressurization line 1120. At this time, when the liquefied natural gas is supplied to the first transfer line 1110, the liquefied natural gas is transferred along the first transfer line 1110 as it is without being pressurized. In contrast to this, when liquefied natural gas is supplied to the first pressurization line 1120, the liquefied natural gas is pressurized by the first pressurization means 1130 to be transferred.

The second transfer unit 1200 includes a second transfer line 1210, a second pressurization line 1220, second pressurization means 1230, and a second switching valve 1240. The second transfer line 1210 and the second pressure line 1220 are connected to each other in parallel. The second pressurization means 1230 is installed in the second pressurization line 1220. The second switching valve 1240 is installed at inlets of the second transfer line 1210 and the second pressurization line 1220. When natural gas flows into the second switching valve 1240, the second switching valve 1240 selectively supplies the natural gas to one of the second transfer line 1210 and the second pressurization line 1220. At this time, when the natural gas is supplied to the second transfer line 1210, the natural gas is transferred along the second transfer line 1210 as it is without being pressurized. In contrast to this, when the natural gas is supplied to the second pressurization line 1220, the natural gas is pressurized by the second pressurization means 1230 to be transferred.

The third transfer unit 1300 includes a third transfer line 1310, a third pressurization line 1320, third pressurization means 1330, and a third switching valve 1340. The third transfer line 1310 and the third pressurization line 1320 are connected to each other in parallel. The third pressurization means 1330 is installed in the third pressurization line 1320. The third switching valve 1340 is installed at inlets of the third transfer line 1210 and the third pressurization line 1320. When natural gas flows into the third switching valve 1340, the third switching valve 1340 selectively supplies the natural gas to one of the third transfer line 1310 and the third pressurization line 1320. At this time, when the natural gas is supplied to the third transfer line 1310, the natural gas is transferred along the third transfer line 1310 as it is without being pressurized. In contrast to this, when the natural gas is supplied to the third pressurization line 1320, the natural gas is pressurized by the third pressurization means 1330 to be transferred.

The complex power generation facility 1000 according to the present invention may further include a first gas line 1150, a second gas line 1160, a third gas line 1170, a fourth gas line 1180, and a cold-heat storage device 1151.

The first gas line 1150 is installed between the first transfer unit 1100 and the first heat exchange apparatus 1400 and liquefied natural gas is transferred from the first transfer unit 1100 to the first heat exchange apparatus 1400. The second gas line 1160 is installed between the first heat exchange apparatus 1400 and the second transfer unit 1200, and natural gas is transferred from the first heat exchange apparatus 1400 to the second transfer unit 1200.

The third gas line 1170 is installed between the second transfer unit 1200 and the second heat exchange apparatus 1500, and natural gas is transferred from the second transfer unit 1200 to the second heat exchange apparatus 1500. The fourth gas line 1180 is installed between the second heat exchange apparatus 1500 and the third transfer unit 1300, and natural gas is transferred from the second heat exchange apparatus 1500 to the third transfer unit 1300. The cold-heat storage device 1151 is connected in parallel to the first gas line 1150 between the first transfer unit 1100 and the first heat exchange apparatus 1400, and liquefied natural gas discharged from the first transfer unit 1100 selectively passes therethrough.

The cold-heat storage device 1151 accommodates a refrigerant (for example, water) therein. In addition, liquefied natural gas passing through the cold-heat storage device 1151 is heated or cooled by exchanging heat with the refrigerant. For example, in a case in which the amount of heat required when the liquefied natural gas discharged from the first transfer unit 1100 is vaporized by the first heat exchange apparatus 1400 is greater than the amount of heat which may be supplied as liquefied natural gas from the first heat exchange apparatus 1400, the liquefied natural gas discharged from the first transfer unit 1100 may pass through the cold-heat storage device 1151. In this case, the refrigerant is solidified from a liquid (water) to a solid (ice), and the liquefied natural gas receives heat emitted to the outside through a phase change of the refrigerant to be increased in temperature and is supplied to the first heat exchange apparatus 1400.

The power generation unit 1600 includes a first turbine 1610, a second turbine 1620, and a fourth switching valve 1630. The first turbine 1610 and the second turbine 1620 are connected to each other in parallel. The fourth switching valve 1630 is installed at inlets of the first turbine 1610 and the second turbine 1620. At this time, the second turbine 1620 depressurizes the received natural gas to have a pressure at the outlet of the second turbine more than a pressure(at the outlet) of the first turbine 1610. For example, natural gas passing through the first turbine 1610 may have a pressure of 10 bar or less, and natural gas passing through the second turbine 1620 may have a pressure of 50 to 70 bar. However, this is only an example, and specific pressure values may be changed.

In this way, in a case in which the first turbine 1610 and the second turbine 1620 having different amount of depressurization are provided, when the state of pressure of the natural gas required by a destination is low (for example, when the destination is a home, a company, or so on), the fourth switching valve 1630 causes the natural gas supplied from the third transfer unit 1300 to pass through the first turbine 1610, and when the pressure of the natural gas required by the destination is high (for example, when the destination is an industrial facility, a thermal power plant, or so on), the fourth switching valve 1630 causes the natural gas supplied from the third transfer unit 1300 to pass through the second turbine 1620. According to the present invention described above, the complex power generation facility 1000 may be flexibly operated according to a change in destination or source of demand by using the first turbine 1610 and the second turbine 1620.

The complex power generation facility 1000 according to the present invention may further include a first line 1410, a second line 1420, a third line 1430, a fourth line 1440, a fifth line 1450, a sixth line 1460, a seventh line 1470, an eighth fine 1480, a first pump 1411, a second pump 1441, a first valve 1442, a second valve 1481, and auxiliary power generation means 1451.

Seawater flows into the first line 1410 from the sea. The second line 1420 connects the first line 1410 to the first heat exchange apparatus 1400, and part of the seawater flowing into the first line 1410 is supplied to the first heat exchange apparatus 1400. The third line 1430 connects the first line 1410 to the first heat exchange apparatus 1400, and the seawater is discharged from the first heat exchange apparatus 1400. The fourth line 1440 is connected to the first line 1410 and the third line 1430 and supplies the second heat exchange apparatus 1500 with the seawater supplied from the first line 1410 and the third line 1430.

Hot water discharged from the first heat exchange apparatus 1400 and hot water discharged from the second heat exchange apparatus 1500 are discharged to the sea through the fifth line 1450. The sixth line 1460 connects the fifth line 1450 to the first heat exchange apparatus 1400 and supplies seawater discharged from the first heat exchange apparatus 1400 to the fifth line 1450. The seventh line 1470 connects the fifth line 1450 to the first heat exchange apparatus 1400 and supplies seawater discharged from the second heat exchange apparatus 1500 to the first heat exchange apparatus 1400. The eighth line 1480 is connected to the fifth line 1450 and the seventh line 1470 and supplies seawater discharged from the second heat exchange apparatus 1500 to the fifth line 1450 and the seventh line 1470.

The first pump 1411 is installed at an inlet of the first line 1410 and pressurizes seawater flowing into the first line 1410. The second pump 1441 is installed in the fourth line 1440 and pressurizes seawater flowing from the first valve 1442 into the fourth line 1440.

The first valve 1442 is installed at a connection portion of the first line 1410, the third line 1430, and the fourth line 1440, and selectively supplies the fourth line 1440 with seawater supplied from any one of the first line 1410 and the third line 1430. When the amount of heat generated from the data center of the first heat exchanger 1400 is less than the required amount of heat of natural gas passing through the first heat exchange apparatus 1500 due to a weak current intensity and so on supplied to the data center accommodated in the second heat exchange apparatus 1400, the first valve 1442 supplies the second heat exchange apparatus 1500 with seawater flowing into the third line 1430 from the first heat exchange apparatus 1400. In contrast to this, when the amount of heat generated from the data center of the first heat exchange apparatus 1400 is sufficient to heat natural gas, the first valve 1442 may supply only the seawater flowing through the first line 1410 to the second heat exchange apparatus 1500.

The second valve 1481 is installed at a connection portion of the fifth line 1450, the seventh line 1470, and the eighth line 1480, and selectively supply one of the fifth line 1450 and the seventh line 1470 with seawater supplied from the eighth line 1480. In a case in which there is a risk of causing a serious problem to the marine ecosystem when seawater discharged from the second heat exchange apparatus 1500 is discharged to the sea as it is because a temperature of the seawater is very low, the second valve 1481 supplies the seawater flowing through the eighth line 1480 to the first heat exchange apparatus 1400 through the seventh line 1470 to heat the seawater, and then the seawater flows through the sixth line 1460 and the fifth line 1450 to the sea. In contrast to this, when the temperature of the seawater discharged from the second heat exchange apparatus 1500 is relatively high, the second valve 1481 supplies the seawater flowing through the eighth line 1480 to the fifth line 1450 to be discharged to the sea.

The auxiliary power generation means 1451 is installed in the fifth line 1450 and generates power as seawater to be discharged to the sea passes through the fifth line 1450. The auxiliary power generation means 1451 may generate the power by using a height difference of seawater flowing through the fifth line 1450, that is, potential energy, but the present invention is not limited thereto.

Hereinafter, operations according to the first to third modes of the present invention will be described with reference to FIGS. 2 to 4.

Figure 2:
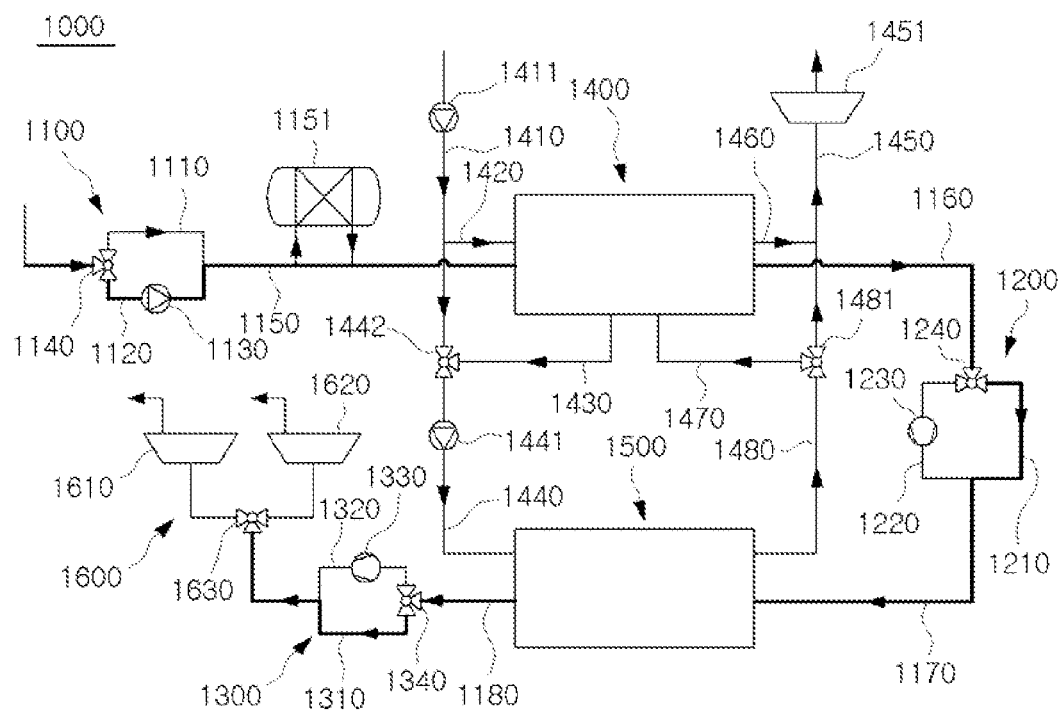
FIGS. 2 to 4 are diagrams illustrating operations in first to third modes of the complex power generation facility in FIG. 1.

Referring to FIG. 2, in the first mode of the present invention, liquefied natural gas supplied to the first switching valve 1140 is supplied to the first pressurization line 1120 to be pressurized by the first pressurization means 1130 and then supplied to the first heat exchange apparatus 1400, natural gas discharged from the first heat exchange apparatus 1400 and supplied to the second switching valve 1240 is supplied to the second heat exchange apparatus 1500 through the second transfer line 1210, and natural gas discharged from the second heat exchange apparatus 1500 and supplied to the third switching valve 1340 is supplied to the power generation unit 1600 through the third transfer line 1310.

Figure 3:
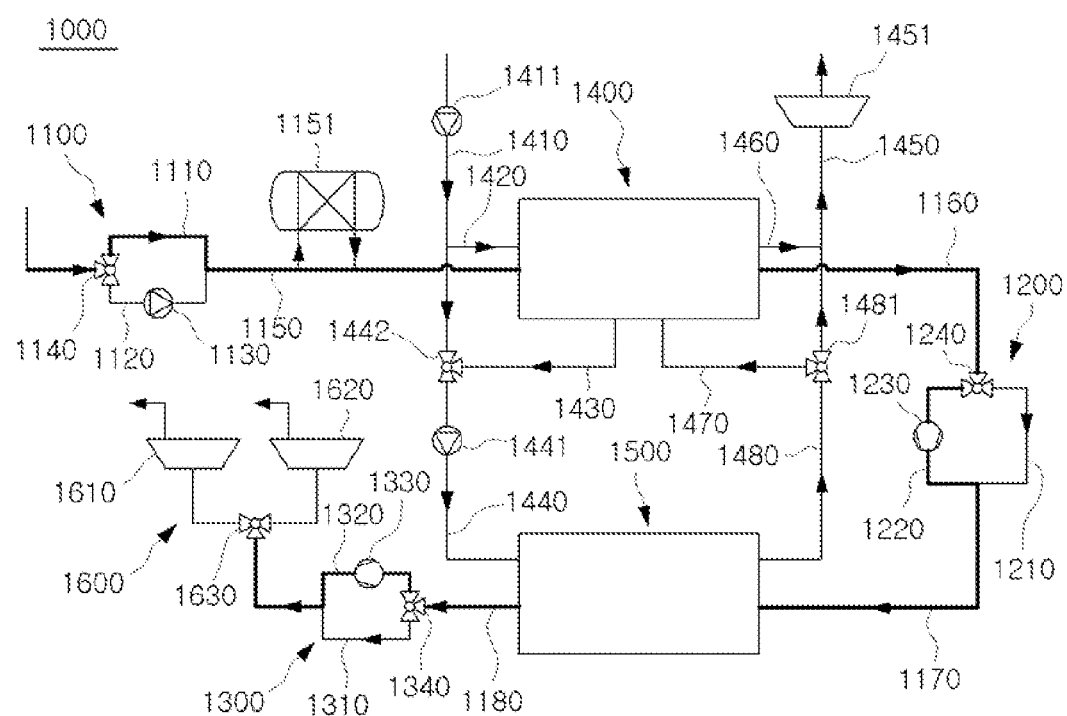

Referring to FIG. 3, in the second mode of the present invention, the liquefied natural gas supplied to the first switching valve 1140 is supplied to the first heat exchange apparatus 1400 through the first transfer line 1110, the natural gas discharged from the first heat exchange apparatus 1400 and supplied to the second switching valve 1240 is supplied to the second pressurization line 1220 to be pressurized by the second pressurization means 1230 and then supplied to the second heat exchange apparatus 1500, the natural gas discharged from the second heat exchange apparatus 1500 and supplied to the third switching valve 1340 is supplied to the third pressurization line 1320 to be pressurized by the third pressurization means 1230 and then supplied to the power generation unit 1600. The second mode of the present invention described above may correct a reduction in pressure when a pressure is reduced as the natural gas passes through the first heat exchange apparatus 1400 and the second heat exchange apparatus 1500.

Figure 4:
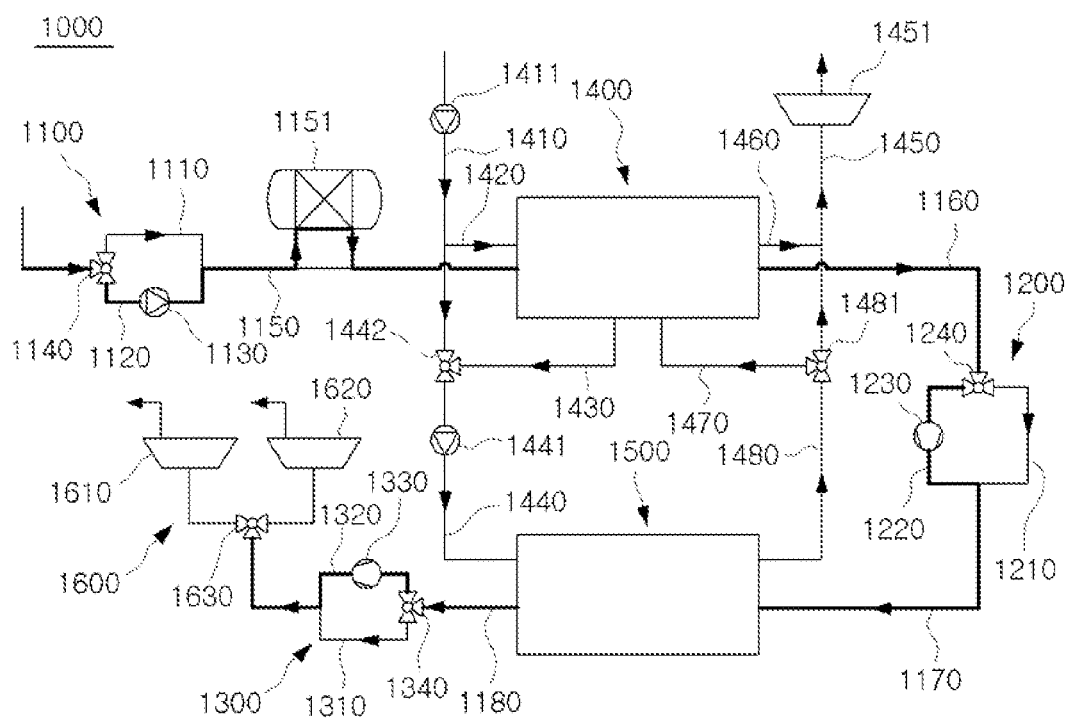

Referring to FIG. 4, in the third mode of the present invention, the liquefied natural gas supplied to the first switching valve 1140 is supplied to the first pressurization line 1120 to be pressurized by the first pressurization means 1130 and then passes through the cold-heat storage device 1151 to be supplied to the first heat exchange apparatus 1400, the natural gas discharged from the first heat exchange apparatus 1400 and supplied to the second switching valve 1240 is supplied to the second pressurization line 1220 to be pressurized by the second pressurization means 1230 and then supplied to the second heat exchange apparatus 1500, and natural gas discharged from the second heat exchange apparatus 1500 and supplied to the third switching valve 1340 is supplied to the third pressurization line 1320 to be pressurized by the third pressurization means 1330 and then is supplied to the power generation unit 1600. The third mode of the present invention may correct a reduction in pressure when a pressure is reduced as the natural gas passes through the cold-heat storage device 1151, the first heat exchange apparatus 1400 and the second heat exchange apparatus 1500.

Hereinafter, heat exchange apparatus 100 and 200 according to first and the second embodiment of the present invention will be described with reference to FIGS. 5 to 7.

Figure 5:
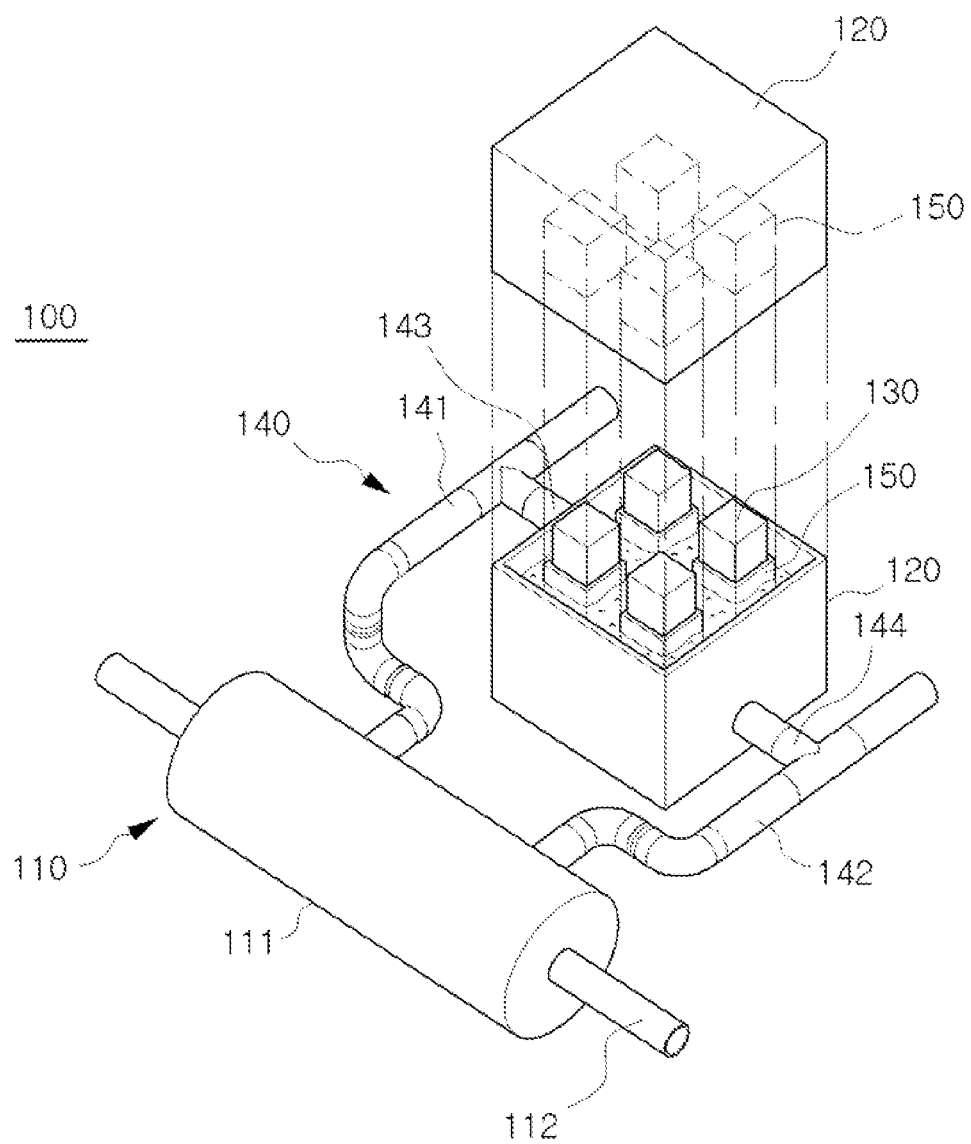
FIG. 5 is a perspective view of a heat exchange apparatus according to a first embodiment of the present invention.

Referring to FIG. 5, in the first embodiment of the present invention, the heat exchange apparatus 100 includes a heat exchanger 110, a reservoir 120, a heat source 130, a seawater flow line 140, and a case 150.

The heat exchanger 110 vaporizes liquefied natural gas passing therethrough and includes a hollow cylindrical heat exchange case 111 into which seawater flows, and a gas flow line 112 through which liquefied natural gas passes and which penetrates the heat exchange case 111. The reservoir 120 accommodates seawater. The heat source 130 is installed inside the reservoir 120 and heats the seawater flowing into the reservoir 120. The seawater flow line 140 connects the heat exchanger 110 to the reservoir 120 and seawater flows through the seawater flow line 140.

The seawater flow line 140 includes a first seawater flow line 141, a second seawater flow line 142, a third seawater flow line 143, and a fourth seawater flow line 144. The first seawater flow line 141 is connected to the heat exchange case 111, and seawater flows therein from the sea. The second seawater flow line 142 is connected to the heat exchange case 111, and seawater is discharged from the heat exchanger 110 and the reservoir 120 to the sea therethrough. The first seawater flow line 141 and the second seawater flow line 142 are arranged to be spaced apart from each other with the reservoir 120 interposed therebetween. The third seawater flow line 143 connects the first seawater flow line 141 to the reservoir 120, and part of the seawater flowing into the first seawater flow line 141 is supplied to the reservoir 120. The fourth seawater flow line 144 connects the second seawater flow line 142 to the reservoir 120, and seawater is discharged from the second reservoir 120 to the second seawater flow line 142 therethrough. That is, the seawater flowing into the first seawater flow line 141 is supplied to the heat exchanger 110 and the reservoir 120, and the seawater discharged from the heat exchanger 110 and the reservoir 120 is discharged to the sea through the second seawater flow line 142.

The case 150 surrounds the heat source 130 and prevents the heat source 130 from coming into direct contact with seawater in the reservoir 120. The heat source 130 is operated by receiving a current and may generate electric heat. For example, the heat source 130 may correspond to a data center. When the heat source 130 is completely immersed in the interior of the reservoir 120, the case 150 may be designed to surround the heat source 130 up and down. In addition, the reservoir 120 may also be designed to surround both the heat source 130 and the case 150 up and down.

Figure 6:
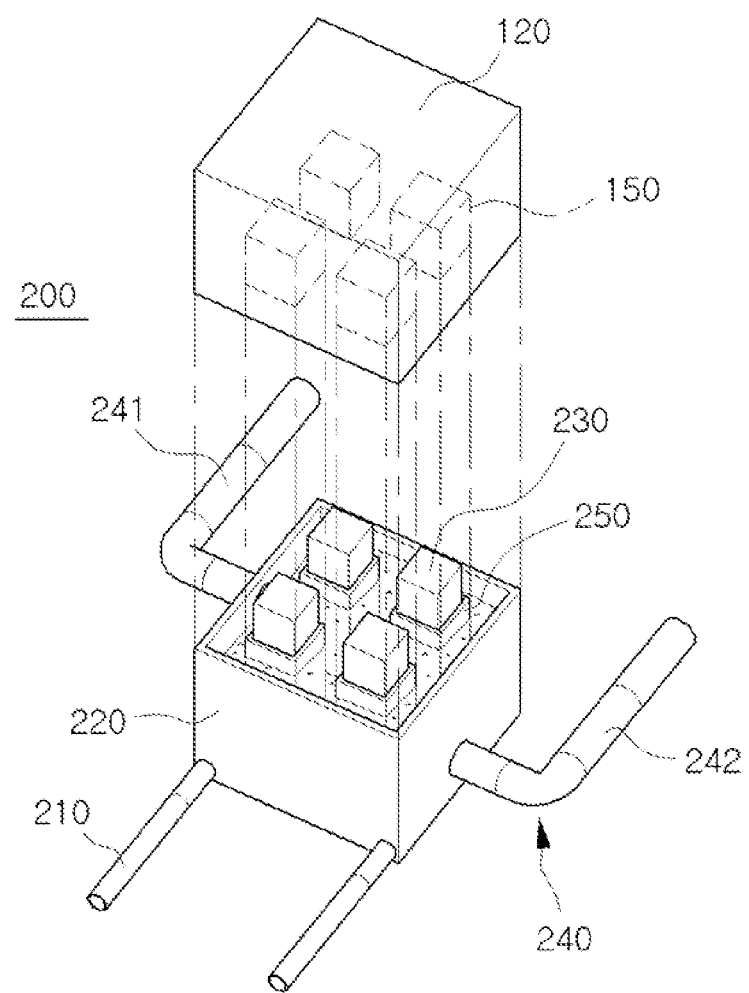
FIG. 6 is a perspective view of a heat exchange apparatus according to a second embodiment of the present invention.
Figure 7:
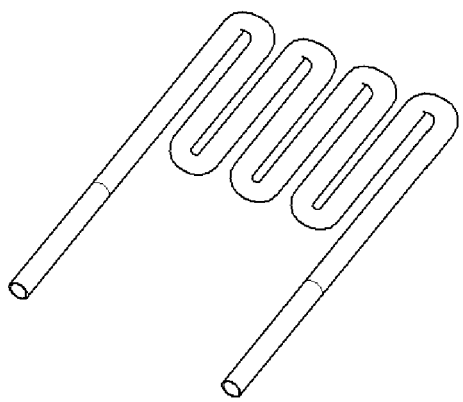
FIG. 7 is a perspective view of a gas flow line illustrated in FIG. 6.

Referring to FIGS. 6 and 7, in the second embodiment of the present invention, the heat exchange apparatus 200 includes a gas flow line 210, a reservoir 220, a heat source 230, a seawater flow line 240, and a case 250. At this time, the reservoir 220, the heat source 230, and the case 250 are the same as the reservoir 120, the heat source 130, and the case 150 in the first embodiment of the present invention, and thus, detailed description thereof is omitted.

Part of the gas flow line 210 is accommodated in the reservoir 220, and liquefied natural gas passes therethrough. More specifically, the gas flow line 210 is installed below the heat source 230 and formed in a meandering shape inside the reservoir 220 to increase an area for exchanging heat with the heat source 230, as illustrated in FIG. 7. The seawater flow line 240 is connected to the reservoir 220 to enable seawater to flow therethrough and includes a first seawater flow line 241 and a second seawater flow line 242. The first seawater flow line 241 supplies seawater from the sea to the reservoir 220. The second seawater flow line 242 discharges seawater from the reservoir 220 to the sea.

When the heat exchange apparatus 100 according to the first embodiment becomes the first heat exchange apparatus 1400, the first seawater flow line 141 is connected to the second line 1420, and the second seawater flow line 142 is connected to the sixth line 1460. In addition, the inlet of the gas flow line 112 is connected to the first gas line 1150, and the outlet of the gas flow line 112 is connected to the second gas line 1160. At this time, a separate line (not illustrated) may also be additionally installed to connect the reservoir 120 to the third line 1430 or the reservoir 120 to the seventh line 1470.

When the heat exchange apparatus 100 according to the first embodiment becomes the second heat exchange apparatus 1500, the first seawater flow line 141 is connected to the fourth line 1440, and the second seawater flow line 142 is connected to the eighth line 1480. In addition, an inlet of the gas flow line 112 is connected to the third gas line 1170, and an outlet of the gas flow line 112 is connected to the fourth gas line 1180.

When the heat exchange apparatus 200 according to the second embodiment becomes the first heat exchange apparatus 1400, the first seawater flow line 241 is connected to the second line 1420, and the second seawater flow line 242 is connected to the sixth line 1460. In addition, an inlet of the gas flow line 210 is connected to the first gas line 1150, and an outlet of the gas flow line 210 is connected to the second gas line 1160. At this time, a separate line (not illustrated) may also be additionally installed to connect the reservoir 220 and the third line 1430 or the reservoir 220 to the seventh line 1470.

When the heat exchange apparatus 200 according to the second embodiment becomes the second heat exchange apparatus 1500, the first seawater flow line 241 is connected to the fourth line 1440, and the second seawater flow line 242 is connected to the eighth line 1480. In addition, an inlet of the gas flow line 210 is connected to the third gas line 1170, and an outlet of the gas flow line 210 is connected to the fourth gas line 1180.

As described above, the complex power generation facility 1000 according to the present invention may vaporize liquefied natural gas into natural gas by using heat of seawater, generate power by enabling high-pressure natural gas to pass through the power generation unit 1600, and sufficiently supply the amount of heat required for vaporization of the liquefied natural gas in the process of additionally heating seawater by using a data center.

In particular, according to the complex power generation facility 1000 of the present invention, seawater supplied to the first heat exchange apparatus 1400 may be selectively supplied to the second heat exchange apparatus 1500 to supplement the amount of heat of natural gas required by the second heat exchange apparatus 1500, and seawater discharged from the second heat exchange apparatus 1500 is heated by selectively passing through the first heat exchange apparatus 1400 to sufficiently heat the seawater to be discharged to the sea, and thus, a marine ecosystem may be prevented from being damaged due to cold drainage.

The invention claimed is:

1. A complex power generation facility comprising:
a first transfer unit that transfers liquefied natural gas;
a first heat exchange apparatus that causes the liquefied natural gas supplied from the first transfer unit to exchange heat with seawater, vaporizes the liquefied natural gas into natural gas, heats the seawater into hot water, and discharges the hot water;
a second heat exchange apparatus that selectively receives the hot water discharged from the first heat exchange apparatus and causes the natural gas passing through the first heat exchange apparatus to exchange heat with seawater and hot water;
a power generation unit that generates power as the natural gas supplied from the second heat exchange apparatus passes therethrough;
a second transfer unit that transfers the natural gas discharged from the first heat exchange apparatus to the second heat exchange apparatus; and
a third transfer unit that transfers the natural gas discharged from the second heat exchange apparatus to the power generation unit,
wherein the first transfer unit includes:
a first transfer line;
a first pressurization line connected to the first transfer line in parallel and provided with the first pressurization means for pressurizing liquefied natural gas; and
a first switching valve that is installed at inlets of the first transfer line and the first pressurization line and selectively supplies received liquefied natural gas to any one of the first transfer line and the first pressurization line,
wherein the second transfer unit includes:
a second transfer line;
a second pressurization line connected to the second transfer line in parallel and provided with the second pressurization means for pressurizing natural gas; and
a second switching valve that is installed at inlets of the second transfer line and the second pressurization line and selectively supplies received liquefied natural gas to any one of the second transfer line and the second pressurization line,
wherein the third transfer unit includes:
a third transfer line;
a third pressurization line connected to the third transfer line in parallel and provided with the third pressurization means for pressurizing natural gas; and
a third switching valve that is installed at inlets of the third transfer line and the third pressurization line and selectively supplies received liquefied natural gas to any one of the third transfer line and the third pressurization line.

2. The complex power generation facility of claim 1, wherein, in the first mode,
liquefied natural gas supplied to the first switching valve is supplied to the first pressurization line to be pressurized by the first pressurization means, and then supplied to the first heat exchange apparatus,
natural gas discharged from the first heat exchange apparatus and supplied to the second switching valve is supplied to the second heat exchange apparatus through the second transfer line, and
natural gas discharged from the second heat exchange apparatus and supplied to the third switching valve is supplied to the power generation unit through the third transfer line.

3. The complex power generation facility of claim 1, wherein, in the second mode,
liquefied natural gas supplied to the first switching valve is supplied to the first heat exchange apparatus through the first transfer line,
natural gas discharged from the first heat exchange apparatus and supplied to the second switching valve is supplied to the second pressurization line to be pressurized by the second pressurization means and then supplied to the second heat exchange apparatus, and
natural gas discharged from the second heat exchange apparatus and supplied to the third switching valve is supplied to the third pressurization line to be pressurized by the third pressurization means and then supplied to the power generation unit.

4. The complex power generation facility of claim 1, further comprising:
a cold-heat storage device that is installed between the first transfer unit and the first heat exchange apparatus and selectively heats or cools the liquefied natural gas by using a phase change of a refrigerant,
wherein, in the third mode,
liquefied natural gas supplied to the first switching valve is supplied to the first pressurization line to be pressurized by the first pressurization means and then passes through the cold-heat storage device to be supplied to the first heat exchange apparatus,
natural gas discharged from the first heat exchange apparatus and supplied to the second switching valve is supplied to the second pressurization line to be pressurized by the second pressurization means and then supplied to the second heat exchange apparatus, and
natural gas discharged from the second heat exchange apparatus and supplied to the third switching valve is supplied to the third pressurization line to be pressurized by the third pressurization means and then supplied to the power generation unit.

5. The complex power generation facility of claim 1,
wherein the power generation unit includes:
a first turbine; and
a second turbine that is connected to the first turbine in parallel and depressurizes the received natural gas to have a pressure at the outlet of the second turbine more than a pressure (at the outlet) of the first turbine.

6. The complex power generation facility of claim 1, further comprising:
- a first line in which seawater flows;
- a second line that connects the first line to the first heat exchange apparatus and supplies part of the seawater flowing into the first line to the first heat exchange apparatus;
- a third line that connects the first line to the first heat exchange apparatus and receives hot water discharged from the first heat exchange apparatus; and
- a fourth line that connects the first line to the third line and supplies the second heat exchange apparatus with seawater supplied from the first line and hot water supplied from the third line.

7. The complex power generation facility of claim 6, further comprising:
- a fifth line in which the hot water discharged from the first heat exchange apparatus flows;
- a sixth line that connects the fifth line to the first heat exchange apparatus and supplies hot water discharged from the first heat exchange apparatus to the fifth line;
- a seventh line that connects the fifth line to the first heat exchange apparatus and supplies hot water discharged from the second heat exchange apparatus to the first heat exchange apparatus; and
- an eighth line that is connected to the fifth line to the seventh line and supplies the hot water discharged from the second heat exchange apparatus to the fifth line and the seventh line.

8. The complex power generation facility of claim 7, further comprising:
- a first valve that is installed at a connection portion between the first line, the third line, and the fourth line, and selectively supplies seawater or hot water supplied from any one of the first line and the third line to the fourth line; and
- a second valve that is installed at a connection portion between the fifth line, the seventh line, and the eighth line, and selectively supplies hot water supplied from the eighth line to any one of the fifth line and the seventh line.

9. The complex power generation facility of claim 7, further comprising:
- auxiliary power generation means that is installed in the fifth line and generates power as hot water flowing through the fifth line passes therethrough.

10. The complex power generation facility of claim 1, wherein the first heat exchange apparatus includes:
- a heat exchanger that vaporizes liquefied natural gas passing therethrough and includes a heat exchange case into which seawater flows and a gas flow line through which the liquefied natural gas passes and which penetrates the heat exchange case;
- a reservoir that accommodates seawater;
- a heat source that is installed in the reservoir and heats seawater flowing into the reservoir; and
- a seawater flow line which connects the heat exchanger to the reservoir and through which seawater flows.

11. The complex power generation facility of claim 1, wherein the first heat exchange apparatus includes:
- a reservoir that accommodates seawater;
- a heat source that is installed in the reservoir and heats seawater flowing into the reservoir;
- a seawater flow line which is connected to the reservoir and through which seawater flows; and
- a gas flow line which is partially accommodated in the reservoir and through which liquefied natural gas passes.

12. The complex power generation facility of claim 10, wherein the heat source is a data center.

13. The complex power generation facility of claim 11, wherein the heat source is a data center.

* * * * *